Patented July 31, 1951

2,562,537

UNITED STATES PATENT OFFICE 2,562,537

STYRENE, FATTY OIL POLYALLYL ETHER COPOLYMERS

John Robert Roach, Minneapolis, Minn., assignor to General Mills, Inc., a corporation of Delaware No Drawing. Application April 5, 1948, Serial No. 19,181

13 Claims. (Cl. 260—17.4)

The present invention relates to copolymers of polyallyl ethers, styrene, and an unsaturated oil and to a method of preparing such copolymers.

Numerous attempts have been made to improve the drying qualities of oils with varying degrees of success. The poor drying properties of semi-drying oils such as soybean oil have been attributed in part to the non-conjugated nature of the unsaturation. To overcome this, it has been suggested that the unsaturation be altered by catalytically conjugating the double bonds in order to improve the rate of drying. Other attempts have taken advantage of the fact that drying properties of an oil are dependent both upon the kind and number of unsaturated carbon to carbon linkages. These attempts involve methods for increasing the degree of unsaturation through esterification of a partial glyceride of unsaturated fatty acids with other unsaturated acids, as for example, acylacrylic acid, cinnamylacetic acid, beta-furylacrylic acid, etc. Since, however, these unsaturated acids are attached to the glycerol molecule by means of an ester linkage, the products are susceptible to hydrolysis by means of water, acids, or alkali. Oils have also been copolymerized with butadiene and styrene to give products which form films that are only fair in hardness and are not resistant to organic solvents.

It has now been found that it is possible to improve the drying properties of unsaturated oils, either drying or semi-drying, by forming copolymers of the oil with polyallyl ethers and styrene. The oil, polyallyl ether and styrene copolymerize with each other to produce stable carbon to carbon linkages which are not susceptible to hydrolysis. The ether linkages of the polyallyl ether are likewise much more stable to hydrolysis than are the ester linkages. It is therefore possible to produce copolymer oils which dry quickly to hard and glossy films, and films which are very resistant to attack by water, alkali or acid and organic solvents. A further advantage of the present invention results from the variety of products which are obtainable through proper choice of the oil and the polyunsaturated ether, through choice of the ratio of the reactants and through control of the degree of reaction. Thus it is possible to control the degree of copolymerization so as to give a partially copolymerized product which can be further processed into varnishes, enamels, paints, and other coating compositions, or it is possible to carry the reaction to the extent necessary to give a highly viscous product which can then be dissolved in ordinary paint solvents and used as such. All of these products have much shorter drying times than the oils from which they are made, both at room temperature and upon baking at 70–100° C. By means of the present invention it is possible to produce films that are hard and glossy even though prepared from as poor a drying oil as soybean oil.

It is therefore an object of the present invention to provide novel synthetic drying oils in the form of copolymers of unsaturated oils, styrene, and a polyallyl ether.

It is another object of the present invention to provide a process of producing such copolymers.

The oils which may be used in the present invention include any unsaturated oil such as the semi-drying oils: soybean oil, cottonseed oil, corn oil, sunflower oil, and others; the drying oils: linseed oil, perilla oil, oiticica oil, castor oil, dehydrated castor oil, tung oil, and others. These oils may be used either in the raw or blown state. In addition, reconstituted oils may be used, for example where the glycerol of a natural oil has been replaced by other polyhydric alcohols such as pentaerythritol, mannitol, sorbitol, etc. It is also possible to employ any synthetic oil in which there is employed the complete mixture of the fatty acids of a natural oil or any selected fraction therefrom, some of which are unsaturated, or in which there are employed unsaturated acids derived from the oxidation of petroleum products.

The polyallyl ethers employed in the copolymer may be simple polyallyl ethers or substituted polyallyl ethers which still contain unsaturated carbon to carbon linkages, or may be composed of mixed polyallyl and/or substituted polyallyl ethers. These allyl ethers can be the polyallyl ethers of such compounds as glycerol, diglycerol, triglycerol, higher polyglycerols, the glycols, pentaerythritol, dipentaerythritol, polypentaerythritol, other formaldehyde condensation products of aldehydes and ketones, mannitol, sorbitol, glucosides, sucrose, etc., as well as diallyl ethers. It is preferred that the degree of etherification of these ethers should be sufficiently high to make the polyallyl ether insoluble in water and soluble in the usual organic solvents such as ethyl ether, benzene, etc. This degree of etherification is commonly referred to as the degree of substitution (D. S.) which is an expression of the number of etherified hydroxyl groups in the compound. In general, it is preferred that the degree of substitution be as high as possible, for example, in allyl sucrose a degree of substitution of 5 or higher produces excellent copolymers.

The proportions of oil, polyallyl ether, and styrene used in the copolymers may be varied considerably, with the most desirable copolymer containing from 50–70% of oil. The remainder preferably is composed of polyallyl ether and styrene, with the weight ratio of these two varying between approximately 1 to 1 and 4 to 1.

The new synthetic oils are prepared in general by mixing the polyunsaturated ether with the oil in the desired ratio, after which the mixture is heated and blown with air for a short period of time, for example, from approximately an hour up to 24 hours, depending upon the temperature. The blowing of the mixture of polyallyl ether and oil is carried out according to the usual procedure for blowing oils. The oil may also be blown for a certain period of time before the introduction of polyallyl ether, either in the presence or absence of metallic driers such as cobalt naphthenate or octoate. In general, temperatures employed during the blowing of the oil and polyallyl ether may vary from 50–150° C., and are preferably within the range 95–140° C. Styrene is then added at intervals with or without the addition of a peroxide, and the copolymerization is continued at an elevated temperature until the desired degree of reaction has been obtained. The temperature during the addition of styrene and subsequent polymerization is preferably held at approximately 110° C., and styrene is added in portions over a period of from four to twelve hours. The use of higher temperatures such as 140–160° C. favors the polymerization of styrene rather than its copolymerization, thus resulting in the formation of a polystyrene which has a low solubility in the reaction mixture, and accordingly precipitates out of solution. This part of the copolymerization is preferably carried out under reflux either in the presence or absence of a peroxide, such as benzoyl peroxide, acetyl peroxide, etc. The extent of the reaction can readily be followed by determination of the refractive index or the viscosity.

The copolymers may be used as such as a finished product or they may be employed in the preparation of paint, varnish, enamel, lacquer, or other protective coating compositions. The products are found to polymerize further to yield highly desirable films either spontaneously or in the presence of such catalysts as heat, light, ultraviolet radiation, oxygen, ozone, peroxides, and metallic driers such as Pb, Co, Mn, etc. in the form of their naphthenates, octoates, stearates, etc. In addition a natural or synthetic resin may be cooked or heat blended with the partially polymerized product to give a useful coating composition.

The resulting films vary in physical properties depending on the composition of the copolymer. As a result, films can be obtained with a wide variety of properties to fit the various requirements. The films are hard, clear, transparent, have good gloss, and are adherent. The copolymers give films which have greatly reduced drying times and have improved resistance to water, acids, alkali, and other chemicals.

The following examples will serve to illustrate the invention:

Example 1

A mixture of 100 parts of soybean oil (alkali refined and bleached) and 66 parts of allyl sucrose (D. S.=6.3) was blown for two hours at 135° C. The mixture was then cooled to 110° C. and 27 parts of styrene was added in three portions over a five-hour period. The temperature was maintained at 110° C. under reflux for an additional two hours and following the removal of unreacted styrene there was obtained a clear, light amber colored copolymer which consisted of 53.5% soybean oil, 35.3% allyl sucrose, and 11.2% styrene. Analytical data on this copolymer was as follows: iodine number 151, acid number 1.8, % OH 3.4, color 9–10, and viscosity Z–Z1. In film drying tests, in the presence of 0.1% cobalt and 0.2% lead at room temperature, its films were set-to-touch in one hour, dust free in 3.25 hours, and tack-free to foil in 8.5 hours. At 95° C. the films were tack-free to foil in 0.5 hour or less. The films had good resistance to hot and cold water, dilute acid and alkali, and common organic solvents.

Example 2

A mixture of 100 parts of soybean oil (alkali refined and bleached) and 30 parts of allyl sucrose was blown for 2 hours at 135° C. The temperature was reduced to 110° C. and 18 parts of styrene was added in four portions over a 3.75 hour period. The reaction was continued at 110° C. under reflux for an additional 8.25 hours to give a copolymer consisting of 67.6% soybean oil, 20.2% allyl sucrose, and 12.2% styrene. The analytical data on this product was as follows: iodine number=138, acid number=1.0, % OH=1.6, color=8, and viscosity O–P. Under the drying conditions of Example 1, it gave films which were set-to-touch in 2.6 hours, dust free in 6.0 hours and showed only slight tack-to-foil in 20 hours or less. At 95° C. it was tack-free to foil in one hour or less.

Example 3

A mixture of 60 parts of soybean oil which had been blown previously for 14 hours at 135° C. and 20 parts of allyl sucrose (D. S.=6.5) was blown for two hours at 135° C. The temperature was reduced to 110° C. and 18 parts of styrene was added in 4 portions over a 4 hour period. The reaction was continued for 2.5 more hours and after removal of unreacted styrene there remained a clear, light yellow colored polymer which consisted of 66.6% soybean oil, 22.2% allyl sucrose, and 11.1% styrene. The copolymer had the following properties: iodine number=128, acid number=1.9, % OH=1.7, color=4–5, viscosity W–X. Under the conditions of Example 1, films formed from it at room temperature were set-to-touch in 2.5 hours, were dust-free in 5.75 hours, and showed only slight tack-to-foil in 19.5 hours. At 95° C. they were tack-free to foil in one hour or less.

Example 4

A mixture of 60 parts of soybean oil (alkali refined and bleached) and 30 parts of allyl sucrose (D. S.=6.5) was blown with air at 135° C. for 3 hours. The temperature was reduced to 110° C. and under reflux 18 parts of styrene and 2 parts of benzoyl peroxide were added in two portions over a 2.5 hour period. The reaction was continued for 2.5 more hours to give a copolymer consisting of 56.7% soybean oil, 28.4% allyl sucrose and 14.9% styrene after the removal of monomeric styrene. The analytical data on the copolymer was as follows: iodine number=135, acid number=3.0, % OH=1.5, color=6, and viscosity=Z1. Under the conditions of Example 1 it gave films at room temperature which were set-to-touch in 1.5 hours, dust-free in 30 hours and were tack-free to foil in less than 17 hours. At 95° C. it was tack-free to foil in 0.5 hours or less.

*Example 5*

A mixture of 60 parts of soybean oil (alkali refined and bleached) and 40 parts of allyl sucrose (D. S.=6.5) was blown with air at 135° C. for 3 hours in the presence of 0.1% cobalt (as the naphthenate) based on the weight of the mixture. Upon cooling to 110° C., 18 parts of styrene and 2 parts of benzoyl peroxide were added in two portions over a 2.5 hour period. The reaction was continued for an additional 2.5 hours to yield a copolymer, which, after removal of unreacted styrene, consisted of 54.1% soybean oil, 36.1% allyl sucrose, and 9.8% styrene. Analytical data on this product was as follows: iodine number=131, acid number=5.0, % OH=1.4, color 16–17, and viscosity=X–Y. In the presence of an additional 0.1% cobalt and 0.2% Pb it gave films at room temperature which were set-to-touch in 2.0 hours, dust free in 3.0 hours and were tack-free to foil in 8 hours.

*Example 6*

A mixture of 60 parts of linseed oil (varnish makers' oil) and 40 parts of allyl sucrose (D. S.= 6.5) was blown with air at 135° C. for 3 hours. Upon cooling to 110° C., 18 parts of styrene and 2 parts of benzoyl peroxide were added in 4 portions over a 3.75 hour period. After an additional 1.25 hour reaction period the monomeric styrene was removed to give a copolymer consisting of 53.5% linseed oil, 35.7% allyl sucrose and 10.8% styrene. Analytical data on this copolymer was as follows: iodine number=150, acid number= 3.6, % OH=1.7, color=8, and viscosity=V–W. Under the conditions of Example 1, this copolymer gave films at room temperature which were set-to-touch in 1.5 hours, were dust-free in 2.75 hours, and were tack-free to foil in 8 hours. At 95° C. the films were tack-free to foil in 0.5 hour or less.

*Example 7*

One hundred parts of bleached, alkali-refined soybean oil was blown for 2.25 hours at 135° C. and then 66 parts of allyl pentaerythritol (freshly redistilled) was added and the blowing was continued for three more hours. The mixture was then cooled to 110° C. and 27 parts of styrene was added in three portions over a 6.25 hour period. The temperature was maintained at 110° C. under reflux for an additional 6.5 hours, and following the removal of unpolymerized styrene there was obtained a clear, light-colored copolymer which consisted of 55.9% soybean oil, 36.8% allyl pentaerythritol and 7.3% styrene. Analytical data on this copolymer was as follows:

| | |
|---|---|
| Iodine number | 182.1 |
| Per cent OH | 2.5 |
| Acid number | 1.3 |
| Color | 3 |
| Viscosity | A–1 |

In film drying tests in the presence of 0.1% cobalt and 0.2% lead at room temperature, its films were dust-free in less than 20 hours but still were not tack-free to foil in one week. At 100° C. the films were tack-free to foil in one hour or less.

*Example 8*

One hundred parts of soybean oil (alkali-refined and bleached) was blown for one hour at 135° C., after which 66 parts of allyl mannitol was added and the copolymerization was continued for two more hours at 135° C. The temperature was then lowered to 110° C. and 30 parts of styrene was added at intervals over a 5.25 hour period. The reaction was then continued for 4.25 more hours, at which time there was obtained after removal of monomeric styrene a clear, light-colored copolymer which consisted of 54.8% soybean oil, 36.1% allyl mannitol and 9.1% styrene. Analytical data on this copolymer was as follows:

| | |
|---|---|
| Iodine number | 191.1 |
| Per cent OH | 1.8 |
| Acid number | 0.8 |
| Color | 5 |
| Viscosity | A–B |

In film drying tests in the presence of 0.1% cobalt and 0.2% lead at room temperature, its films were tack-free to foil in 23 hours or less and at 100° C. they were tack-free to foil in one hour.

*Example 9*

One hundred parts of soybean oil was blown for one hour at 135° C. and then 66 parts of diallyl glycerol was added, and the copolymerization was continued for four more hours. The mixture was then cooled to 110° C. and 30 parts of styrene was added at intervals over a 6.5-hour period. The reaction was continued for an additional 1.5 hours, and upon removal of monomeric styrene there was obtained a light, colored copolymer which consisted of 54.9% soybean oil, 36.3% diallyl glycerol and 8.8% styrene. Analytical data on this copolymer was as follows:

| | |
|---|---|
| Iodine number | 150.3 |
| Per cent OH | 3.1 |
| Acid number | 1.4 |
| Color | 4–5 |
| Viscosity | B–C |

In film drying tests in the presence of 0.1% cobalt and 0.2% lead at room temperature, its films were set-to-touch in 4 hours but were not tack-free to foil in one week.

All of the copolymers in the above examples are soluble in benzene, turpentine, butyl acetate, lacquer solvent, and acetone. They tend to give cloudy solutions in aliphatic hydrocarbon solvents. These solutions can be clarified readily by the addition of a small amount of any of the above solvents.

As has been pointed out, a wide variety of drying and semi-drying oils or blown oils may be used. For economic reasons it is desired to produce copolymers containing from 50–70% of oil. It is possible, however, to produce copolymers in which the oil is a minor constituent, in which case the copolymer gives films of increased hardness and solvent resistance. Likewise, the polyallyl ether which is employed may be any polyallyl ether in which the degree of etherification is high enough so that it is miscible with the oil or that it becomes soluble and compatible through a small amount of copolymerization. The ratio of polyallyl ether to oil may be varied widely, but the amount of polyallyl ether used determines the amount of styrene which may be employed. The larger the quantity of the unsaturated ether, the larger the amount of styrene that can be copolymerized without danger of producing insoluble polystyrene.

While various modifications of the above invention have been described, it is to be understood that this invention is not limited thereto,

I claim as my invention:

1. A liquid, soluble copolymer containing between 50% and 70% of an unsaturated fatty oil, styrene, and a polyallyl ether, the weight ratio of styrene to polyallyl ether being within the range between 1 to 1 and 1 to 4.

2. A liquid, soluble copolymer containing between 50% and 70% of soybean oil, styrene, and allyl sucrose, the weight ratio of styrene to allyl sucrose being within the range between 1 to 1 and 1 to 4.

3. Process of producing a liquid, soluble copolymer of an unsaturated fatty oil, a polyallyl ether, and styrene, which comprises partially polymerizing the polyallyl ether and the unsaturated oil at a temperature within the range of 50–150° C., adding styrene, and continuing the polymerization at a temperature of around 110° C.

4. Process of producing a liquid, soluble copolymer of an unsaturated fatty oil, polyallyl ether, and styrene, which comprises blowing a mixture of the polyallyl ether and the unsaturated oil at a temperature of 50–150° C. to partially copolymerize the ether and the oil, adding styrene slowly over a period of from 4 to 12 hours, and copolymerizing the mixture at a temperature of about 110° C.

5. Process of producing a liquid, soluble copolymer of soybean oil, styrene, and allyl sucrose, which comprises mixing allyl sucrose and soybean oil, blowing the mixture at a temperature within the approximate range of 95–140° C. to partially copolymerize the oil and the ether, adding styrene slowly over a period of from 4 to 12 hours, and copolymerizing the mixture at a temperature of about 110° C.

6. A liquid, soluble copolymer comprising a principal quantity of an unsaturated fatty oil, and lesser but substantial quantities of a polyallyl ether and of styrene.

7. A liquid, soluble copolymer comprising a principal quantity of a blown unsaturated fatty oil, and lesser but substantial quantities of a polyallyl ether and of styrene.

8. A liquid, soluble copolymer comprising a principal quantity of a semi-drying fatty oil, and lesser but substantial quantities of a polyallyl ether and of styrene.

9. A liquid, soluble copolymer comprising a principal quantity of a drying fatty oil, and lesser but substantial quantities of a polyallyl ether and of styrene.

10. A liquid, soluble copolymer comprising a principal quantity of a reconstituted unsaturated fatty oil, and lesser but substantial quantities of a polyallyl ether and of styrene.

11. A liquid, soluble copolymer comprising a principal quantity of soybean oil, and lesser but substantial quantities of a polyallyl ether and of styrene.

12. A liquid, soluble copolymer comprising a principal quantity of an unsaturated fatty oil, and a lesser but substantial quantity of allyl sucrose and of styrene.

13. A liquid, soluble copolymer comprising a principal quantity of soybean oil, and a lesser but substantial quantity of allyl sucrose and of styrene.

JOHN ROBERT ROACH.

REFERENCES CITED

The following references are of record in the file of this patent:

UNITED STATES PATENTS

| Number | Name | Date |
| --- | --- | --- |
| 2,037,740 | Salzberg | Apr. 21, 1936 |
| 2,273,891 | Pollack et al. | Feb. 24, 1942 |
| 2,341,175 | Britton et al. | Feb. 8, 1944 |
| 2,395,504 | Rubens et al. | Feb. 26, 1946 |
| 2,450,234 | Evans et al. | Sept. 28, 1948 |
| 2,462,817 | Smith | Feb. 22, 1949 |